United States Patent Office 3,458,866
Patented Aug. 5, 1969

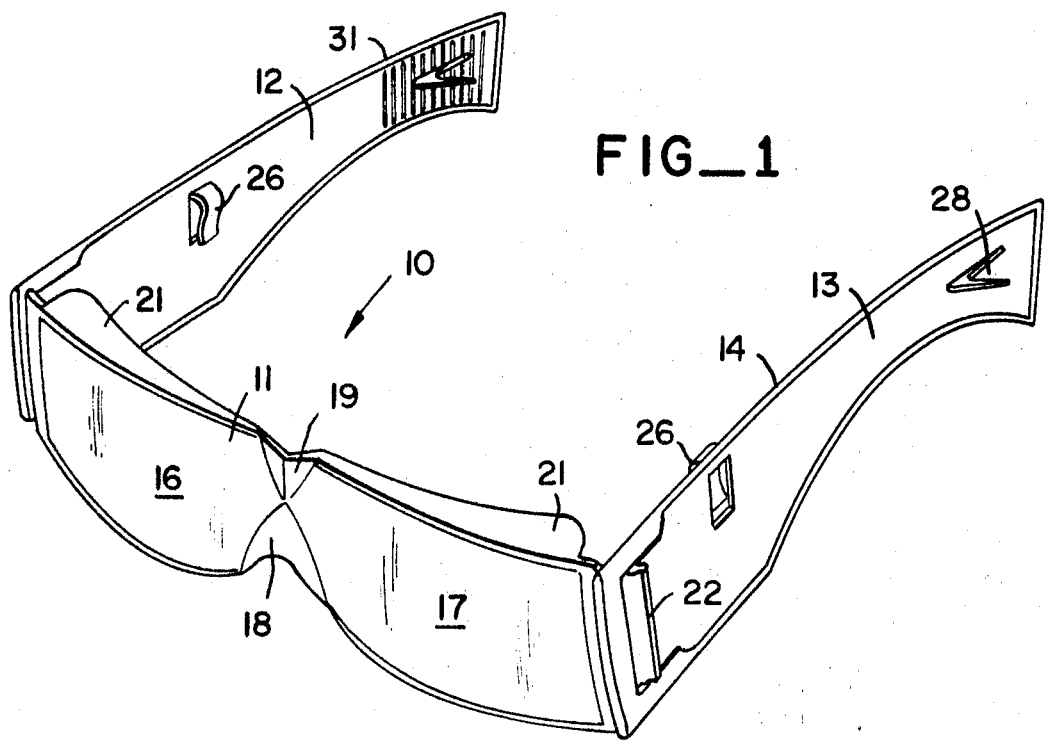
FIG_1
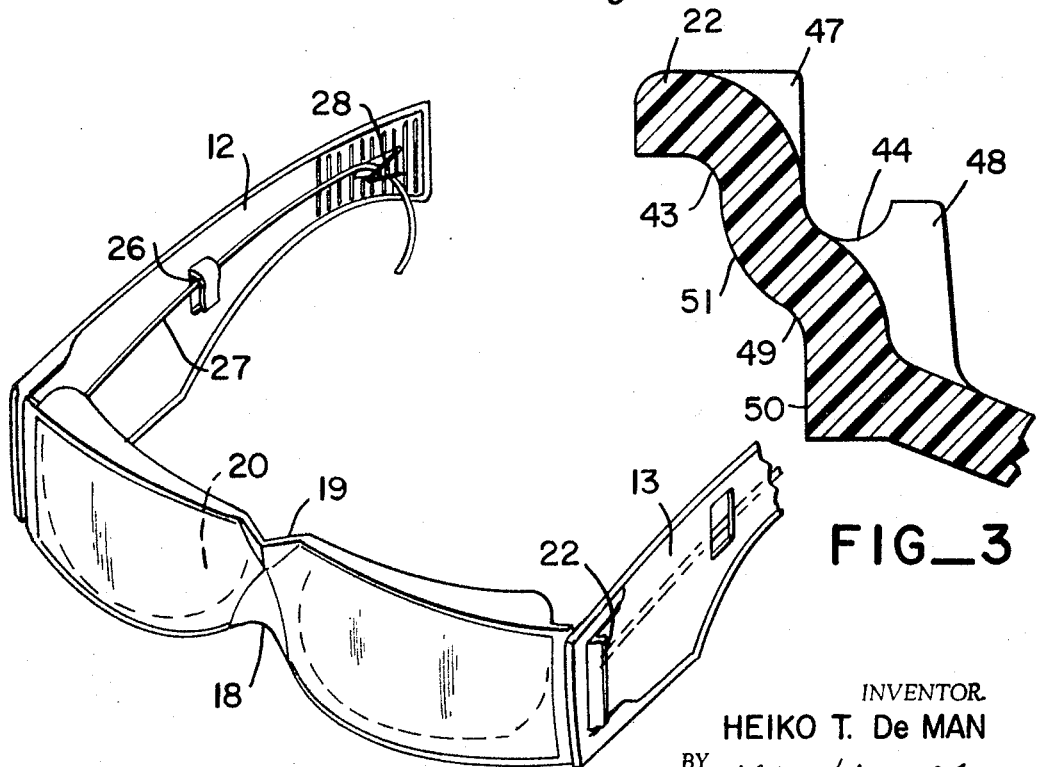
FIG_2
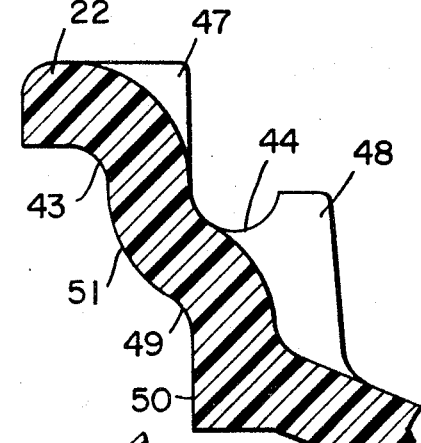
FIG_3
INVENTOR.
HEIKO T. De MAN

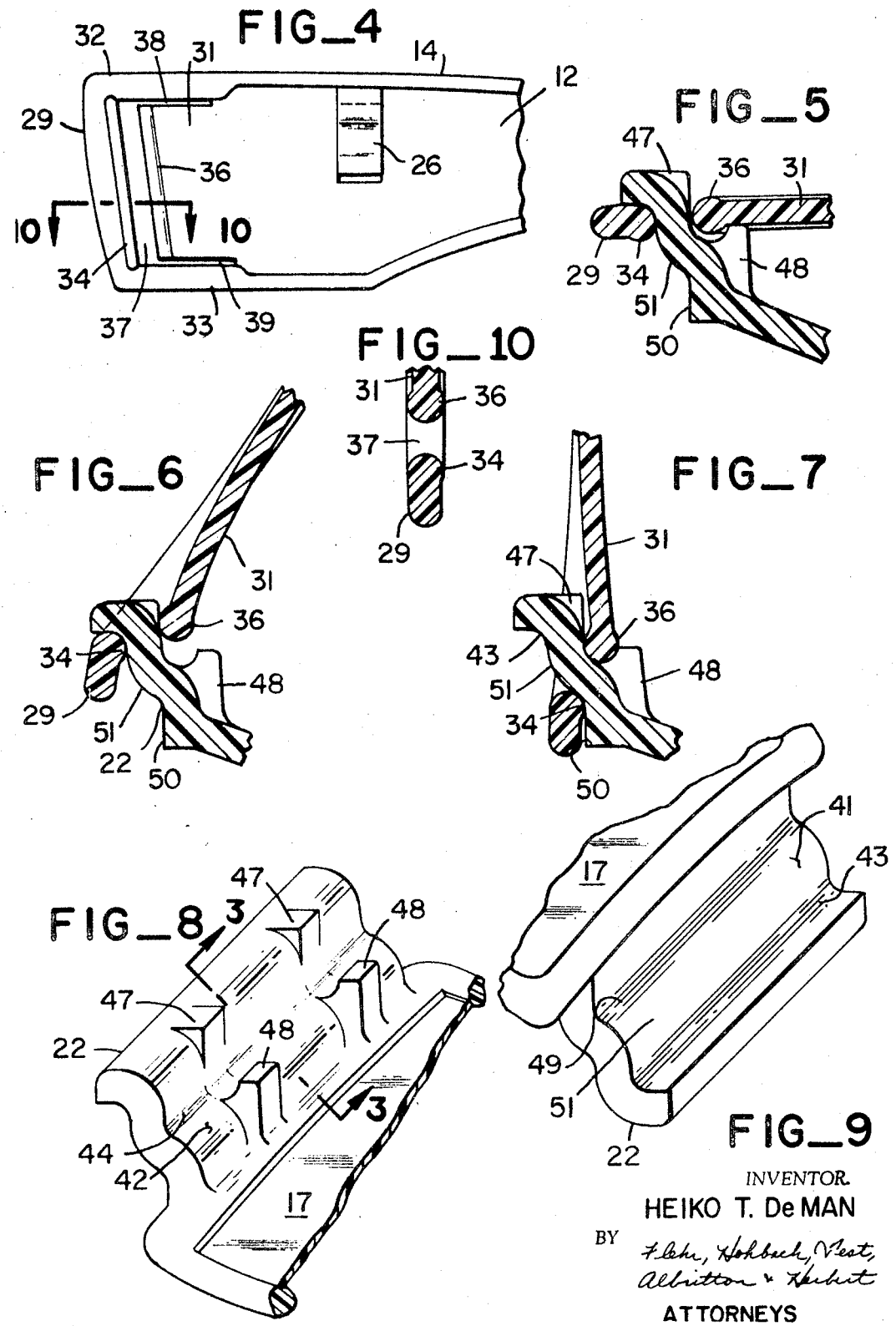

3,458,866
EYEGLASS HINGE CONSTRUCTION
Heiko T. de Man, Moraga, Calif., assignor to Precision Plastics, Inc., San Francisco, Calif., a corporation of California
Filed Dec. 7, 1967, Ser. No. 688,778
Int. Cl. E05d 9/00, 15/00
U.S. Cl. 2—12                                        6 Claims

ABSTRACT OF THE DISCLOSURE

A plastic, frameless, eyeshield has three parts, an opening-free, one-piece eyecover and two temples. A hinge connection between the temple and eyecover includes two spaced pivots on each temple which move over a corrugated plate extending from the eyecover. A centering element is formed above the nose piece of the cover and clip elements are formed on the inside of the temples to mount the eyeshield on prescription spectacles.

---

Background of the invention and objects

This invention pertains to an improved eyeshield construction.

Ophthalmologists in the course of an eye examination perform a procedure to dilate the pupils of the patient's eyes. Following the examination the physician provides his patient with a tinted eyeshield to avoid discomfort or injury to the eyes from bright lights and sunlight. Not uncommonly the patent already wears corrective lens spectacles and it is thus desirable that the eyeshields should fit over or mount upon the patient's spectacles to enable him to go about his daily affairs with a minimum of discomfort and inconvenience. Because of the patient's dilated pupils it is highly desirable for the eyeshields to occlude from the field of view the maximum amount of direct light impinging on the pupil.

In factories and shops safety rules require visitors and employees to wear eyeshields especially in work areas where grinding, turning or welding are performed. An eyeshield with an imperforate viewing member is highly desirable here to block the maximum number of particles and thus to optimally protect the eye. In each of the above applications it is customary for the eyeshield to be distributed free of charge to the user. But at the same time it is recognized that to insure proper and continued usage of the eyeshield by the wearer, the device should be attractive in appearance as well as rugged and durable in use. Flimsy or unattractive eyeshields resembling children's toys are not regarded by adults as useful devices and are soon discarded.

Certain eyeshield constructions in the prior art, for example, as shown in Patents Nos. 2,630,569 and 3,155,-982 to Baratelli generally were either not adapted to fit over spectacles or had undesirable light admitting openings in the eyeshield or temple members and were either too expensive to produce, or too closely resembled children's toys to satisfy adult wearers.

In general it is an object of this invention to provide an improved but inexpensive eyeshield construction wearable over prescription spectacles.

A further object of the invention is to provide in an eyeshield construction an improved hinge connection between the eyeshield member and the temples, such hinge connection being attractive in appearance, rugged in design and permitting rapid assembly.

An additional object of the invention is to provide an improved eyeglass construction which is devoid of light admitting openings in the eyeshield portion while accommodating a highly simplified, fastener free hinge construction.

Further objects and features will appear from the following description in which the preferred embodiment of the invention has been set forth in detail in conjunction with the accompanying drawing.

Summary of the invention

A pair of temples are connected to a one piece imperforate eyeshield in a fold-permitting connection. A corrugated hinge plate extending from the margin of the eyeshield is embraced by spaced, elongate, pivot elements on the temple, one pivot element being arranged on a resilient flexible tongue. As the temple is opened, the tongue is flexed and the pivots shift over the hinge plate in a snap action. To permit wearing over spectacles a centering element is provided above the nosepiece and clip elements are formed on the inside of the temple to mount the eyeshield on prescription spectacles.

Brief description of drawings

FIGURE 1 is a perspective view of an eleshield constructed in accordance with the present invention;

FIGURE 2 is a view like FIGURE 1 showing the instant eyeshield mounted over a pair of prescription spectacles;

FIGURE 3 is a fragmentary, enlarged sectional view taken in the direction of the arrows along the line 3—3 of FIGURE 8;

FIGURE 4 is a fragmentary elevational view of the right hand temple of the present eyeshield;

FIGURES 5–7 are fragmentary sectional views of a fold permitting connection showing the sequence of relationships of the members involved when the temples are moved from the storage to the open wearing position;

FIGURES 8 and 9 are each fragmentary enlarged perspective views of the male hinge member of the present invention; and FIGURE 10 is a sectional view taken in the direction of the arrows along the line 10—10 of FIGURE 4.

An eyeshield 10 in accordance with the present invention is shown in FIGURE 1 of the drawings and includes a one-piece eyeshield member 11 and right 12 and left 13 temple members, all preferably with beaded side edges 14. The parts 11–13 may be of any suitable transparent plastic material either tinted or clear depending upon the use for which the eye protective device is intended, and the parts may be readily molded by mass production methods. The one-piece eyeshield member 11 includes right and left viewing portions, 16 and 17, and an outwardly projecting saddle or nose engaging portion 18. Above the saddle 18 is an auxiliary saddle 19, the inside surface of which is configurated to serve a centering function when the eye protective device 10 is worn over a pair of spectacles as shown in FIGURE 2. Along the upper margin of each of the viewing portions, 16, 17 there is formed integrally with the eyeshield 11 an upper shield 21 the free edge of which is shaped to follow the contour of the brow of the wearer so as to protect him from the glare of the sun or other high intensity light sources from above. It will be observed that there are no apertures, perforations or other openings in the one-piece eyeshield member 11 thus affording a substantial amount of protection to the eyes of the wearer.

A hinge member or corrugated hinge plate 22 is formed integrally with the eyeshield 11 at the side margin of each viewing portion. The hinge member 22 extends rearwardly and outwardly from the side marginal portions of the eyeshield 11 as shown in FIGURES 8 and 9. Further details of the member 22 will be considered below in association with the hinge portions of the temple members.

The temples 12 and 13 are made as right and left hand members, but otherwise they have identical features.

For brevity, only the right temple 12 will be described in detail. The inside surface of the temple 12 is provided with a hook-like protruding element or clip 26 which is adapted to fit over the temples 27 of the spectacles 20. The rearward portion of the temple 12, which is serrated for increased gripping contact, includes a V-shaped element 28 into which the wire-like end portions of the temples 27 may be received. Alternatively, an elastic head strap may be fitted through the dart-like V opening 28 to retain the device more securely upon the head of the wearer.

The bead 14 extends along both the inside and outside edge of the temple 12 thereby producing a thickened periphery about the thinner web. At the front end portion of the temple there is provided a hinge bar member 29 and a tongue element 31, as clearly shown in FIGURE 4. In outline the hinge bar 29 is C-shaped having rearwardly extending arms 32 and 33 of substantially the same thickness as the double beaded margin of the temple. A rounded pivot or bearing surface 34 is provided by an enlargement (FIGURE 10) for rocking against the associated surfaces on the hinge plate 22. Similarly, the free end of the tongue 31 is provided with a cylindrical bearing surface or pivot 36, the bearing surfaces 34 and 36 being substantially parallel and spaced apart to define a slot 37, for receiving the hinge plate 22. As shown in FIGURE 4, the slot 37 is in communication with upper and lower slits 38, 39 which provide freedom for flexing the tongue 31. The tongue 31 (FIGURE 10) is somewhat thinner in cross-section than the hinge bar 29 and thus will deform preferentially to the hinge bar.

Referring to FIGURES 8 and 9, the hinge plate 22 has a generally corrugated configuration and is provided with an outside cam surface 41 and an inside cam surface 42. The outside cam surface includes a first recess or dwell 43 for receiving the hinge bar 29, and the inside cam surface is provided with a second recess or dwell 44 for receiving the bearing surface 36 on the free end of the tongue 31. A pair of outer abutments 47 are formed integrally with the hinge plate on the inner cam surface outwardly of the second recess or dwell 44. A pair of retaining abutments or keepers 47 are disposed inwardly on the cam surface 42, the abutments 48 being configured to act as an extension of that bearing surface. A third recess or dwell 49 is provided on the outer surface of the hinge member 22 adjacent to the margin of the viewing portion of the eyeshield 11 and inwardly of a knee 51 which protrudes outwardly on the surface 41.

It will be observed that a shoulder 50 is provided adjacent to the third recess or dwell 49 as shown in FIGURES 5–7.

The temples 12, 13 are mounted over the hinge element 22 of the eyeshield, in a simple manual operation without the aid of tools. Specifically, the slot 37 is aligned with the edge of the hinge plate 22 and slight pressure is applied to the forward portion of the temple deflecting the tongue 31 to snap over the outer abutments 47. The bearing surface 36 on the free end of the tongue comes to rest in the second recess or dwell 44 and is maintained from further inward motion by the retaining abutments 48.

Referring to FIGURES 5–7, as the temple is moved from the closed storage position, as shown in FIGURE 5, to the open or wearing position, as shown in FIGURE 7, the tongue 31 and the hinge bar 29 move relative to each other in a snap action over the knee 51 of the hinge plate 22. In the closed or storage position the hinge bar 29 is disposed with its pivot or bearing surface 34 in the first recess 43 and the pivot or bearing surface 36 of the tongue 31 is disposed up and out of the second recess or dwell 44 and somewhat in engagement with the outer abutments 47. As the temple member is lifted towards the wearing position, as shown in FIGURE 6, the tongue is deflected out of the plane of the temple while the hinge bar pivots about the contact points between the bearing surface 34 and the recess or dwell 43. Quite abruptly, there is a shift of operative pivots when the hinge bar and pivot 34 snap over the knee 51 to be received in the third recess or dwell 49 and the pivot 36 on the end of the tongue is received in the second recess or dwell 44. As shown in FIGURE 7, the outer abutments 47 engage the tongue 31 and maintain it in a flexed position. The pivot portion of the hinge bar engages the shoulder 50.

When moving the temple from the storage position toward the open or wearing position, the pivot 34 on the hinge bar 29 and recess or dwell 43 are operative during the first portion of travel. The outer abutments 47 engage the pivot 36 to bias the tongue 31 and cause the pivot 36 to move inwardly toward the recess or dwell 44 (FIGURE 6). In the final portion of travel, following the hinge bar snapping over the knee, the pivot 36 and recess or dwell 44 are operative (FIGURE 7). The pivot 36 and dwell 44 are also operative when moving the temple from the open to the closed position.

While in the open position (FIGURE 7) the temples and particularly the tongues thereof are stressed in a manner, which due to the nature of the material, induces plastic creep. In the closed position the inner abutments 48 bias the tongue in the opposite direction thereby causing a reversal of the creep direction in the material. This enhances the life of the flexing tongue action.

In view of the foregoing it will be understood that there is disclosed an improved eye cover construction which may be economically manufactured from inexpensive materials which are rugged and aesthetically pleasing in design and which fulfills all of the objects set out above.

While there has been described what is at present considered to be the preferred embodiment of the invention, it will be understood that various modifications may be made therein.

I claim:

1. A protective eye cover comprising: an eyeshield member and a pair of temple members each joined to said eyeshield member in a fold permitting connection, said connection including a hinge plate extending from one of said eyeshield or temple members, the other connected member having a hinge bar and a resilient tongue, said resilient tongue including a free end spaced from said hinge bar to define a slot therebetween, said hinge plate being received in said slot permitting the connected members to pivot from a closed storage position to an open wearing position, outside and inside cam surfaces on said hinge plate arranged to engage, respectively, said hinge bar and the free end of said tongue, said outside cam surface being configured to include a first dwell engaged by the hinge bar in the storage position, and a second dwell engaged by the hinge bar in the operative position, an outwardly protruding knee on said outside cam surface intermediate said first and second dwells, the spacing between said tongue and the hinge bar being such as to permit the hinge bar to be moved from said first to said second dwell in a snap-action over said knee.

2. An eye protective device as in claim 1 wherein the inside cam surface of said hinge member is provided with abutments means, and the tongue in the storage condition of said temple is disposed in the general plane of said temple, the free end portion of the tongue being arranged to engage said abutment means when said temple is moved to the wearing position serving the flex said tongue inwardly of the plane of said temple to bias said temple towards the head of the wearer.

3. An eye protective device as in claim 1 wherein the portions of said hinge bar and said tongue which engage the respective cam surfaces are each provided with smooth cylindrical surfaces substantially parallel to one another and extending along the respective cam surfaces.

4. An eye protective device as in claim 1 wherein there is arranged on each of said temples clip means for mounting the eye protecting device upon the temples of a pair of spectacles permitting the instant protective device to be worn thereover.

5. An eye protective device, comprising, an eyeshield member, and a pair of temple members joined to said eyeshield member in a double-pivot connection permitting said temple to be folded from a wearing to a storage position, said double pivot connection including a hinge plate on one of said eyeshield or temple members, the other or said members including elongate, spaced apart first and second pivot elements defining a slot therebetween for receiving said hinge plate therethrough, said hinge plate having on one side thereof a first recess serving to receive said first pivot element when said connected members are moved from the storage position towards a position penultimate to the wearing position, the other side of the hinge plate having a second recess serving to receive said second pivot element when said members are moved from the penultimate position to the final wearing position, and from the wearing to the storage position.

6. The protective eyecover of claim 5 wherein said first pivot element is included on the free end of a resilient, flexible tongue, said hinge plate including means for flexing said tongue in the final portion of opening travel of the members, said hinge plate including further means so arranged that the shift in pivot location is accomplished with a snap action.

References Cited
UNITED STATES PATENTS

| | | |
|---|---|---|
| 2,630,569 | 3/1953 | Baratelli et al. |
| 2,874,609 | 2/1959 | Ducati _____ 351–113 |
| 3,155,982 | 11/1964 | Bartelli _____ 2—12 |

H. HAMPTON HUNTER, Primary Examiner

U.S. Cl. X.R.

2—13, 14; 351—113, 153; 16—128